United States Patent [19]
Seta

[11] Patent Number: 5,301,194
[45] Date of Patent: Apr. 5, 1994

[54] PACKET RE-TRANSMITTING SYSTEM FOR SATELLITE COMMUNICATION SYSTEM OF THE SLOTTED-ALOHA TYPE

[75] Inventor: Mitsuru Seta, Kawasaki, Japan

[73] Assignee: Fujitsu Limited, Kawasaki, Japan

[21] Appl. No.: 890,180

[22] Filed: May 29, 1992

[30] Foreign Application Priority Data

May 30, 1991 [JP] Japan .................. 3-127791

[51] Int. Cl.$^5$ ........................................ H04B 7/212
[52] U.S. Cl. ........................ 370/95.1; 370/85.3; 370/93; 370/95.3; 370/104.1; 375/111; 371/32; 371/35
[58] Field of Search ............... 370/83.5, 95.1, 95.3, 370/93, 104.1; 375/111; 371/32-35

[56] References Cited

U.S. PATENT DOCUMENTS

| | | | |
|---|---|---|---|
| 4,398,289 | 8/1983 | Schoute | 370/93 |
| 4,766,599 | 8/1988 | Miyazaki | 371/32 X |
| 4,817,089 | 3/1989 | Paneth et al. | 370/95.1 |
| 5,172,375 | 12/1992 | Kou | 370/95.3 |

Primary Examiner—Douglas W. Olms
Assistant Examiner—Russell Blum
Attorney, Agent, or Firm—Staas & Halsey

[57] ABSTRACT

The present invention provides a packet re-transmitting system for a slotted-ALOHA type satellite communication system wherein communications are effected between a central office and a large number of local offices by way of a communications satellite and which decreases a packet re-transmitting time remarkably. The central office transmits a frame synchronizing signal, manages a reception slot number in a predetermined phase relationship with the frame synchronizing signal, detects a condition of a reception signal from any of the local offices and sends back a receiving condition signal including a reception slot number and detection information of a receiving condition at the point of time. Each of the local offices manages a transmission slot number in a predetermined phase relationship with a received frame synchronizing signal, compares a transmission slot number at a point of time when a packet was transmitted with a reception slot number in the receiving condition signal and re-transmits, when the transmission slot number corresponds to the reception slot number in the receiving condition signal and detection information of a received condition indicates irregularity, the transmission packet.

11 Claims, 9 Drawing Sheets

FIG. 5

| FLAG | ADDRESS INFORMATION | CONTROL INFORMATION | DATA | FCS | FLAG |

5,301,194

PACKET RE-TRANSMITTING SYSTEM FOR SATELLITE COMMUNICATION SYSTEM OF THE SLOTTED-ALOHA TYPE

BACKGROUND OF THE INVENTION

This invention relates to a packet re-transmitting system for a satellite communication system of the slotted-ALOHA type, and more particularly to a packet re-transmitting system for a satellite communication system of the slotted-ALOHA type wherein communications between a central office and a large number of local offices are effected by way of a communications satellite.

A satellite communication system of the slotted-ALOHA type is suitable to efficiently effect communications between a central office having a high information processing capacity and a large number of scattered local offices which involve a small amount of information by way of satellite channels interconnecting them.

By the way, if it is permitted for a large number of local offices to transmit packets at an arbitrary point of time, then the transmission packets will overlap frequently with each other on satellite channels, and consequently, the central office cannot receive them correctly.

Therefore, according to the satellite communication system of the slotted-ALOHA type, the central office transmits a slot signal, and each of the local offices transmits a packet signal in synchronism with the slot signal, thereby preventing otherwise possible occurrence of an overlap of transmission packets.

Even with the satellite communication system of the slotted-ALOHA type, however, it sometimes occurs that different local offices transmit packets to the same slot. In this instance, the packets collide with each other, and accordingly, each of the local offices must re-transmit its packet.

Therefore, minimization of such a packet re-transmission time is demanded.

FIG. 1 illustrates a conventional packet re-transmitting system for a satellite communication system of the slotted-ALOHA type. Referring to FIG. 1, the packet re-transmitting system shown includes a communications satellite 3, a central office 100 and a large number of local offices as represented by local offices 200a and 200b.

The central office 100 includes a terminal equipment 101, a packet transmission processing section 102, a modulator 103, a transmitter/receiver 104, a demodulator 105 and a packet reception processing section 106.

The terminal equipment 101 effects inputting and outputting processing of original data (packets). The packet transmission processing section 102 effects transmitting processing of a packet of data from the terminal equipment 101. The modulator 103 effects modulating processing such as, for example, QPSK.

The transmitter/receiver 104 includes, though not shown, a transmitting section including an up converter and a high power amplifier, and a receiving section including a down converter and a low noise amplifier, and effects up converting processing and amplifying processing for a signal from the modulator 103 and also effects down converting processing and so forth for a reception signal. The demodulator 105 effects demodulating processing for a reception signal, and the packet reception processing section 106 effects receiving processing of a packet of demodulated data.

Each of the local offices 200a and 200b includes a terminal equipment 201, a packet transmission processing section 202, a modulator 203, a transmitter/receiver 204, a demodulator 205, a packet reception processing section 206 and a timer 207.

The terminal equipment 201, packet transmission processing section 202, modulator 203, transmitter/receiver 204, demodulating section 205 and packet reception processing section 206 have substantially similar functions to those of the terminal equipment 101, packet transmission processing section 102, modulator 103, transmitter/receiver 104, demodulator 105 and packet reception processing section 106 of the central office 100, respectively. The timer 207 is provided to manage the time for re-transmission of a packet.

In the satellite communication system, the central office 100 transmits a slot signal SLT of a predetermined period by way of a down channel f1 while any of the local offices 200a and 200b transmits a packet in synchronism with the slot signal SLT.

By the way, in such a system which adopts a system of the ALOHA type or the slotted-ALOHA type as the satellite communication system described above, the scale (in diameter of an antenna, transmitting output power and so forth) of the local offices 200a and 200b is usually so small that, for example, the local office 200a cannot directly receive a relay signal from the communications satellite 3 of a packet transmitted from the local office 200a itself. Accordingly, the local office 200a cannot directly find from a relay signal from the communications satellite 3 whether or not a transmission packet therefrom has collided with another transmission packet from another local office 200b, but can find, only when it receives a reception answer signal (notification that a packet has been received regularly) from the central office 100 in accordance with an ordinary communications protocol, that the transmission packet has been received regularly.

In the meantime, at the central office 100, if packets from the local offices 200a and 200b collide with each other, then the data of them will be destroyed, and consequently, the central office 100 cannot determine whether or not a local office has actually transmitted a packet to the central office 100 and naturally cannot send back a reception answer signal.

Therefore, it is a conventional practice to employ, on the local office side, a timer which operates, for example, for several seconds (refer to the timer 207 in FIG. 1) after it sends out a packet and to follow a procedure wherein the packet is re-transmitted if no reception answer signal is received from the central office within the time of the timer.

Accordingly, with the conventional packet re-transmitting system, when packets of different local offices collide with each other on satellite channels, no reception answer signal can be received from the central office as described above, and consequently, a very long period of time is required for re-transmission of a packet. As a result, the transmission efficiency is low and data to be re-transmitted must be kept for a long period of time. The problems are particularly remarkable when data are transmitted in a plurality of packets.

SUMMARY OF THE INVENTION

It is an object of the present invention to provide a packet re-transmitting system for a satellite communication system of the slotted-ALOHA TYPE by which a packet can be re-transmitted in a remarkably shorter time than ever.

In order to achieve the object, according to the present invention, there is provided a packet re-transmitting system for a slotted-ALOHA type satellite communication system, which carries out communication between central office and a plurality of local offices by way of a communications satellite, comprising central office having transmission means for transmitting a frame synchronizing signal, managing means, operatively connected to the transmission means, for managing a reception slot number in a relative phase relationship with the frame synchronizing signal received from the transmission means, and receiving condition signal outputting means, operatively connected to the managing means, for detecting a condition of each reception signals from any of local offices, and for outputting a receiving condition signal including a reception slot number from the managing means and detection information of a receiving condition at the point of time, a plurality of local offices each having receiving means for receiving the frame synchronizing signal and receiving condition signal from the central office, slot number managing means, operatively connected to the receiving means, for managing a transmission slot number in a relative phase relationship with the received frame synchronizing signal, comparison means, operatively connected to the slot number managing means and the receiving means, for comparing a transmission slot number from the slot number managing means at a point of time when a packet was transmitted from the local office with a reception slot number in the receiving condition signal from the receiving means, and re-transmission processing means, operatively connected to the comparison means and the receiving means, for re-transmitting the packet when the comparing means determines that the transmission slot number corresponds to the reception slot number in the receiving condition signal and the receiving condition detection information in the receiving condition signal indicates irregularity.

Preferably, the central office transmits a slot signal and a frame synchronizing signal synchronized with the slot signal.

A receiving condition signal or signals to any of the local offices corresponding to a certain transmission frame may be sent back either collectively immediately after a corresponding reception frame of the central office or immediately after a corresponding reception frame of the central office.

Preferably, the reception slot number managed by the central office and the transmission slot numbers managed by the local offices coincide with each other.

Preferably, the reception slot number managed by the central office is displaced in phase from the frame synchronizing signal by a time required for a signal to go to and return from the communications satellite.

The reception managing means may include a delay circuit for delaying the frame synchronizing signal and the slot signal by a predetermined phase amount, and a reception slot number managing counter for operating in response to the frame synchronizing signal and the slot signal delayed by the delay circuit. Further, the receiving condition signal outputting means may include a memory for storing therein the reception slot number and the receiving condition detection information.

The re-transmission processing means may include gate means for producing, when the transmission slot number corresponds, in accordance with a result of comparison by the comparison means, to the reception slot number in the receiving condition signal and the receiving condition detection information indicates irregularity, a re-transmitting processing instruction for the transmission packet. Further, the slot number managing means may include a counter for managing the transmission slot number. meanwhile, the local office may include a timer which produces, when a predetermined period of time elapses after transmission of the packet, a re-transmission processing instruction for the transmission packet.

With the packet re-transmitting system for a satellite communication system of the slotted-ALOHA type, the concept of a frame is introduced into a satellite communication system of the slotted-ALOHA type, and a corresponding relationship is established between slot numbers of the local offices and the central office. The central office adds a slot number to a signal of a receiving condition from any of the local offices and sends back a thus obtained signal to the local offices, and each of the local offices compares with the thus received signal with the transmission slot number thereof so that it can find rapidly whether a packet thereof has been transmitted regularly or irregularly. Consequently, even if transmission packets from any of the local offices collide with each other on a satellite channel, the colliding condition can be discriminated rapidly with certainty. As a result, an advantage is provided that a packet re-transmitting time can be reduced remarkably. Consequently, improvement in transmission efficiency can be achieved and the necessity of keeping re-transmission data for a long period of time is eliminated. The advantages are particularly remarkable when data are transmitted in a plurality of packets.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 5 is a diagram illustrating construction of a packet;

DESCRIPTION OF THE PREFERRED EMBODIMENT

Figure 2:
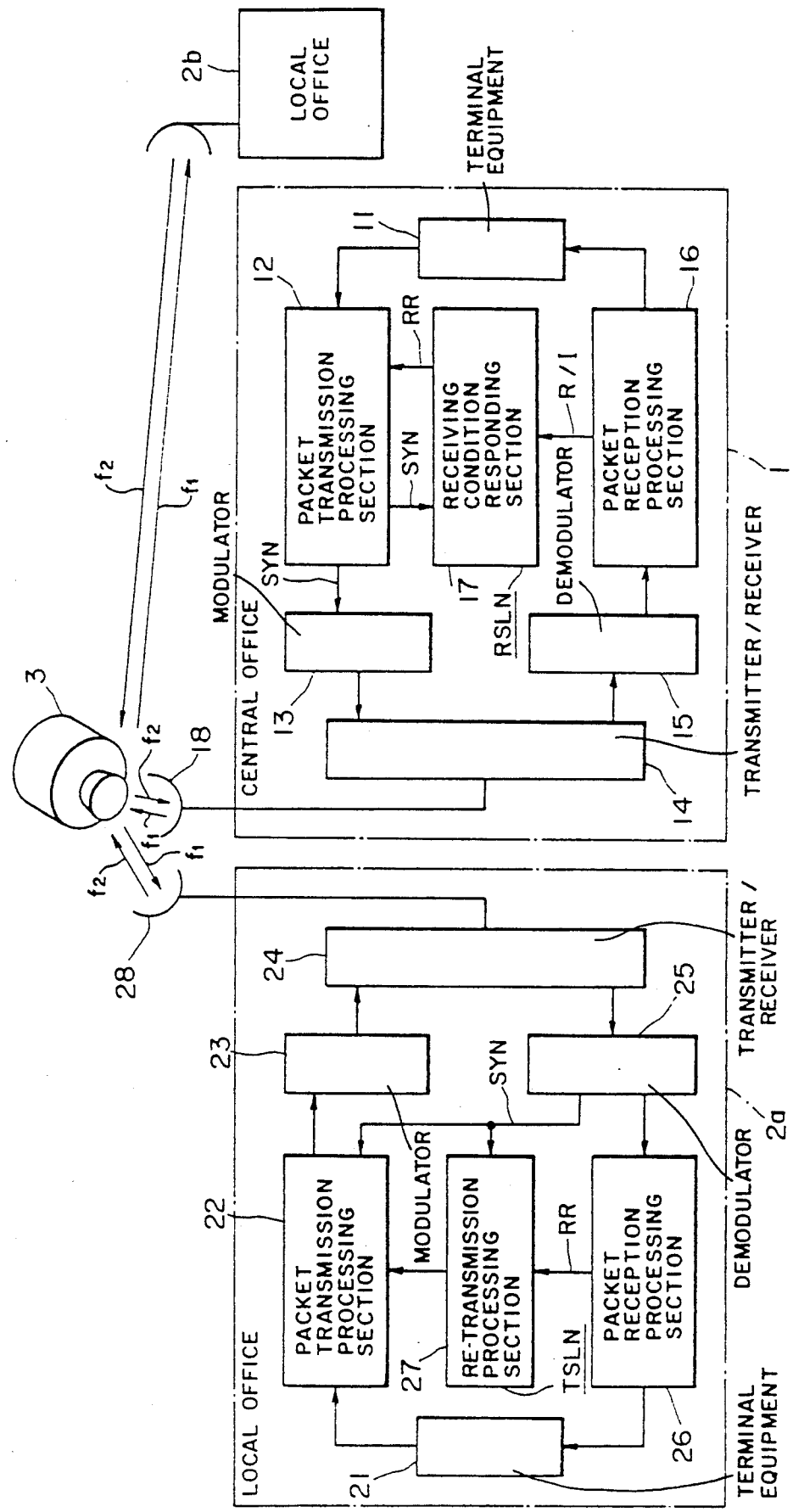
FIG. 2 is a block diagram illustrating a packet re-transmitting system of the slotted-ALOHA type showing a preferred embodiment of the present invention.

Referring first to FIG. 2, there is shown a packet re-transmitting system for a satellite communication system of the slotted-ALOHA type according to a preferred embodiment of the present invention. The packet re-transmitting system shown includes a central office 1 and a large number of local offices as represented by local offices 2a and 2b between which communications are performed by way of a communications satellite 3. In particular, the central office 1 transmits a frame synchronizing signal SYN, manages a reception slot number RSLN in a predetermined phase relationship with the frame synchronizing signal SYN, detects a condition of each of reception signals from any of the local offices and sends back a receiving condition signal RR which includes the reception slot number and detection information R/I of the receiving condition at the point of time. Meanwhile, each of the local offices 2a and 2b manages a transmission slot number TSLN in a predetermined phase relationship with a received frame synchronizing signal SYN and compares a reception slot number in a receiving condition signal with a transmission slot number at a point of time when the packet was transmitted. Further, each of the local offices 2a and 2b re-transmits a transmission packet when its transmission slot number corresponds to the reception slot number in the receiving condition signal and the receiving condition detection information R/I in the receiving condition signal indicates irregularity I.

It is to be noted that the central office 1 need not necessarily transmit a slot signal because the local offices 2a and 2b by themselves can form slots synchronized with each other, if each of the local offices 2a and 2b has a PLL circuit and they operate in a PLL synchronized relationship with a frame synchronizing signal SYN, by frequency dividing the frame synchronizing signal SYN. However, according to the satellite communication system of the slotted-ALOHA type, since a slot signal is usually sent out from the central office 1, if the frame synchronizing signal SYN is synchronized with a slot signal by the central office 1, then the local offices 2a and 2b can omit their PLL circuits. Therefore, the following description will be given the case wherein the satellite communication system is the ordinary slotted-ALOHA type.

Figure 3:
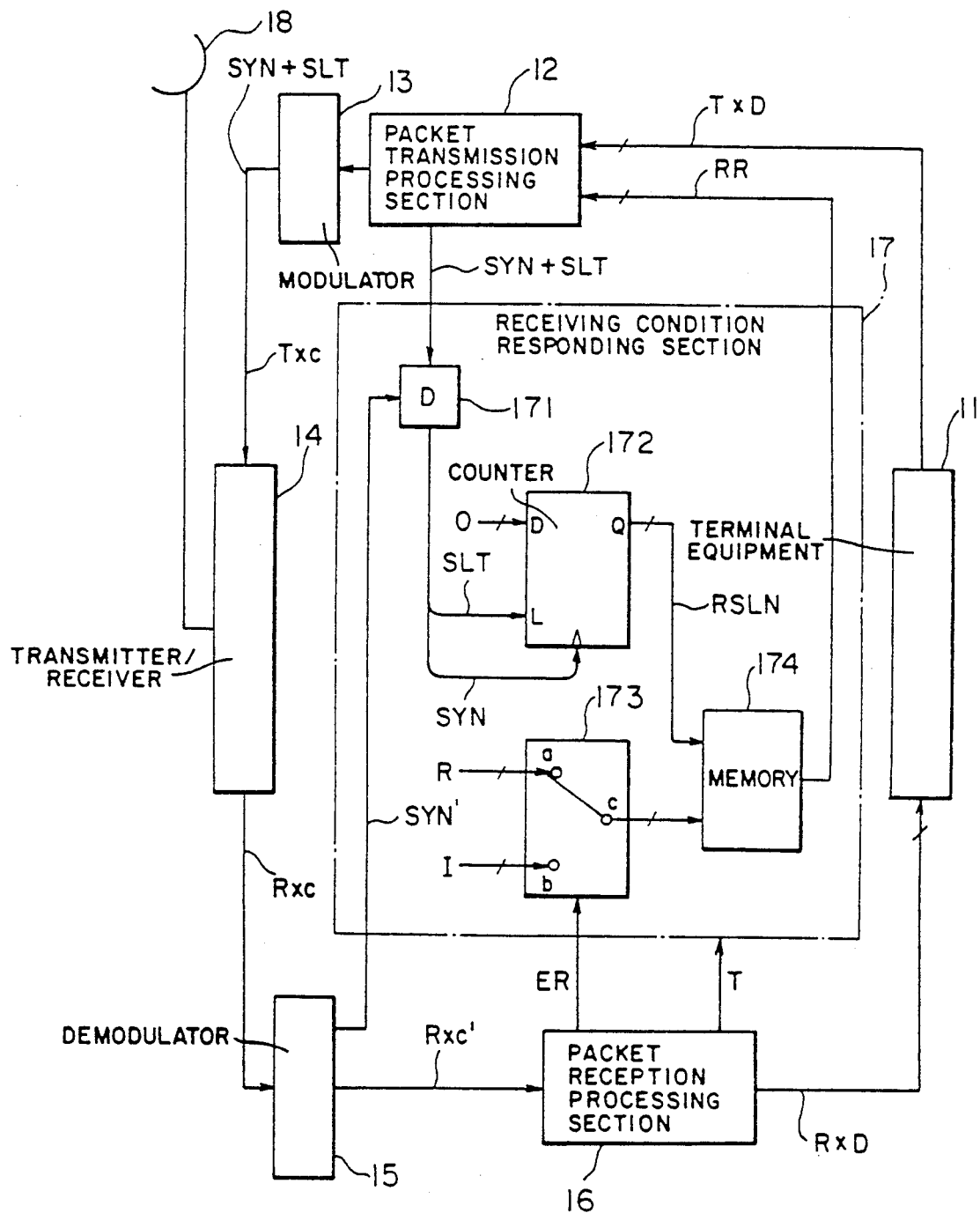
FIG. 3 is a block diagram of a central office of the packet re-transmitting system of FIG. 2.

In the packet re-sending system for a satellite communication system of the slotted-ALOHA type of the present embodiment shown in FIG. 2, communications are effected between the central office 1 and a large number of local offices as represented by the local offices 2a and 2b by way of the communications satellite 3 as described above. Referring also to FIGS. 2 and 3, the central office 1 includes a terminal equipment 11, a packet transmission processing section 12, a modulator 13, a transmitter/receiver 14, a demodulator 15, a packet reception processing section 16, a receiving condition responding section 17 and an antenna 18.

Here, the terminal equipment 11 effects inputting and outputting processing of original data (packet). The packet transmission processing section 12 effects transmitting processing of data from the terminal equipment 11 in the form of a packet of such a format as shown, for example, in FIG. 5. The modulator 13 effects modulating processing such as, for example, QPSK.

The transmitter/receiver 14 includes, though not shown, a transmitting section including an up converter and a high power amplifier and a receiving section including a down converter and a low noise amplifier, and effects up converting processing and amplifying processing of a signal from the modulator 13 and down converting processing and so forth of a reception signal. The demodulator 15 effects demodulating processing of a reception signal.

The packet reception processing section 16 effects receiving processing of a packet of demodulated data and detects a condition of a reception signal from any of the local offices 2a and 2b such as whether the reception signal is normal or has a frame check error or that a reception power higher than a predetermined level has been detected but does not present a form as a packet, or the like. The packet reception processing section 16 outputs a thus detected condition to the receiving condition responding section 17.

The receiving condition responding section 17 manages a reception slot number RSLN in a predetermined phase relationship with a frame synchronizing signal SYN, detects a condition of a reception signal from any of the local offices 2a and 2b and outputs a receiving condition signal including the reception slot number RSLN and detection information (R/I) of the receiving condition at the point of time. To this end, the receiving condition responding section 17 includes, as shown in FIG. 3, a delay circuit 171, a reception slot number managing counter 172, a switch circuit 173 and a memory 174.

The delay circuit 171 delays a frame synchronizing signal SYN and a slot signal SLT by a time required for the signals SYN and SLT to go to and return from the communications satellite 3 with respect to a predetermined phase (frame synchronizing signal SYN). The counter 172 manages a reception slot number RSLN in a predetermined phase relationship with a frame synchronizing signal SYN delayed by the delay circuit 171. The counter 172 thus functions as a reception slot number managing section together with the delay circuit 171.

The switch circuit 173 selectively outputs a no-error code R or an error code I in accordance with a result of detection by the packet reception processing section 16. The memory 174 stores therein a reception slot number RSLN from the counter 172 and receiving condition detection information (R/I) from the switch circuit 173. The switch circuit 173 and the memory 174 cooperate with each other to constitute a receiving condition signal outputting section which detects a condition of a reception signal from any of the local offices 2a and 2b and outputs a receiving condition signal including a reception slot number RSLN and receiving condition detection information (R/I) at the point of time. The memory 174 outputs stored data thereof in response to a carry-out signal from the counter 172.

Figure 4:
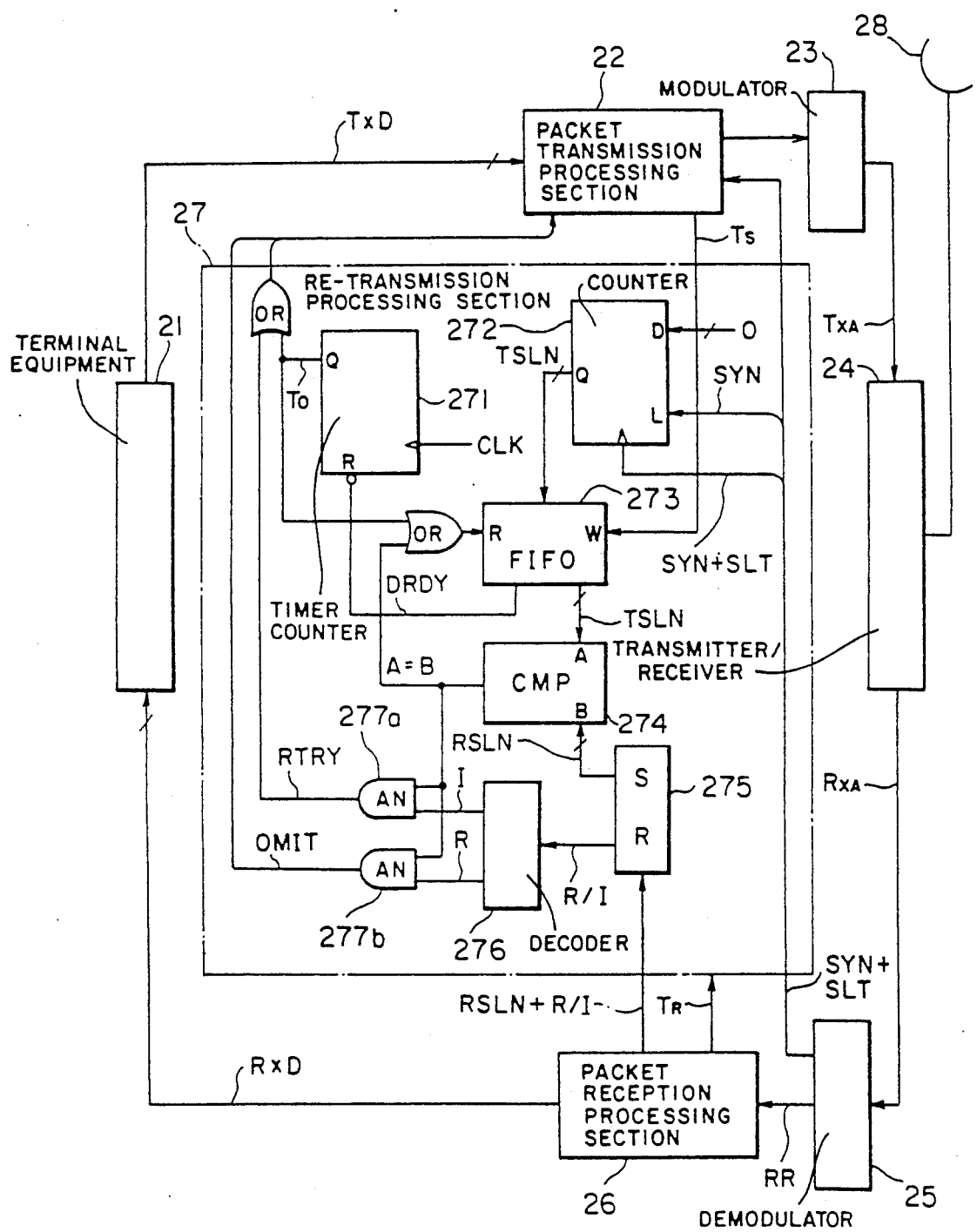
FIG. 4 is a block diagram of a local office of the packet re-transmitting system of FIG. 2.
Figure 6:
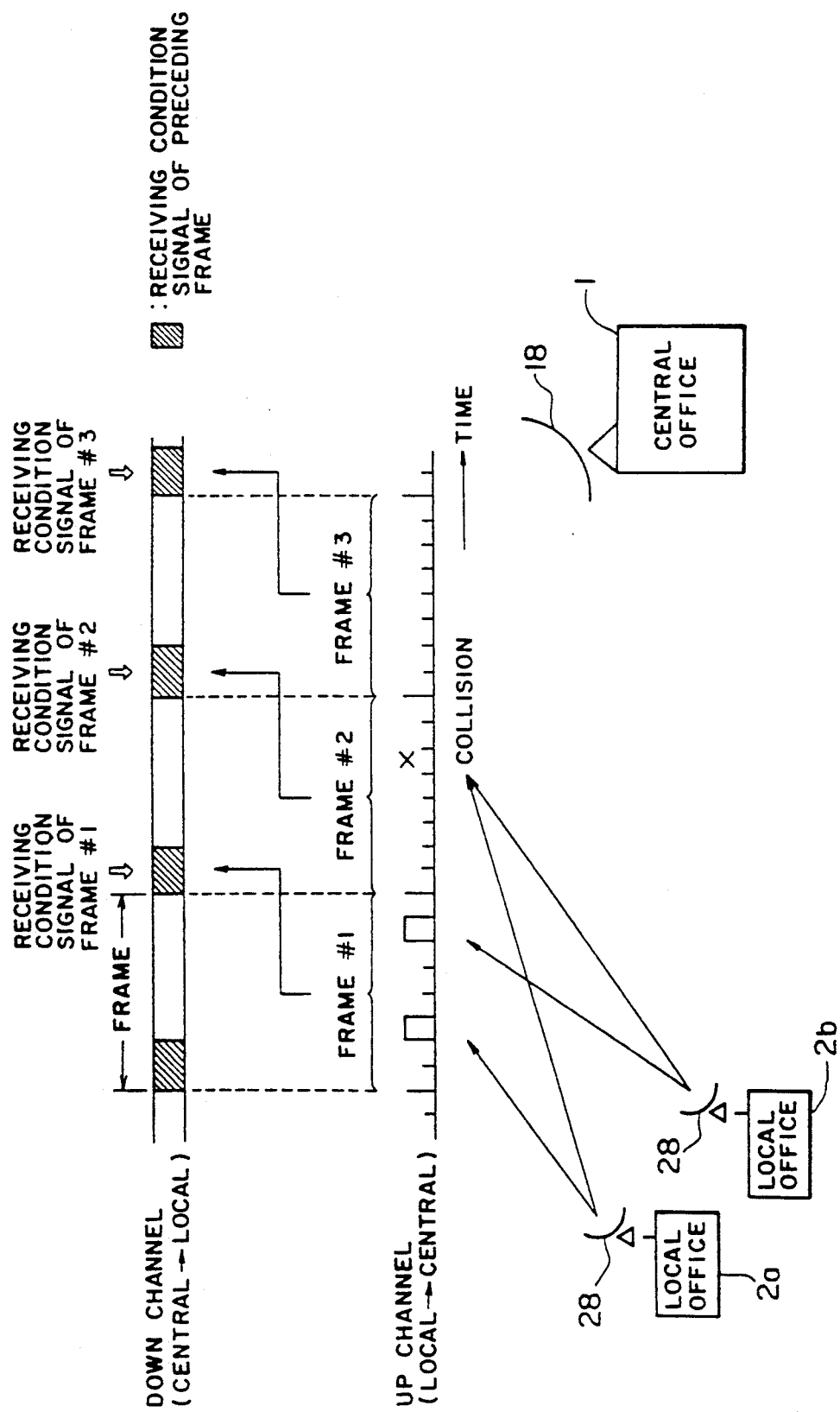
FIG. 6 is a diagram illustrating an image of signals on satellite channels in the packet re-transmitting system of FIG. 2.

Referring now to FIGS. 2 and 4, each of the local offices 2a and 2b includes a terminal equipment 21, a packet transmission processing section 22, a modulator 23, a transmitter/receiver 24, a demodulator 25, a packet reception processing section 26, a re-transmission processing section 27 and an antenna 28.

The terminal equipment 21, packet transmission processing section 22, modulator 23, transmitter/receiver 24, demodulator 25 and packet reception processing section 26 have substantially similar functions to those of the terminal equipment 11, packet transmission processing section 12, modulator 13, transmitter/receiver 14, demodulator 15 and packet reception processing section 16 of the central office 1, respectively, and accordingly, detailed description of them is omitted herein to avoid redundancy. It is to be noted that the packet reception processing section 26 receives a receiving condition signal RR from the central office 1 and detects a reception slot number RSLN and detection information (R/I) of a receiving condition in the receiving condition signal RR.

The re-transmission processing section 27 receives a reception slot number RSLN and receiving condition detection information (R/I) from the packet reception processing section 26 and manages a transmission slot number TSLN. Further, the re-transmission processing section 27 compares a reception slot number RSLN in a receiving condition signal RR with a transmission slot number TSLN at the point of time when the packet was went out, and effects re-transmitting processing of the transmission packet when the transmission slot number TSLN corresponds to the reception slot number RSLN in the receiving condition signal RR and the receiving condition detection information (R/I) indicates irregularity (I). To this end, the re-transmission processing section 27 includes, as shown in FIG. 4, a timer counter 271, a counter 272, a FIFO memory 273, a comparator 274, a shift register 275, a decoder 276 and a pair of AND gates 277a and 277b.

Figure 1:
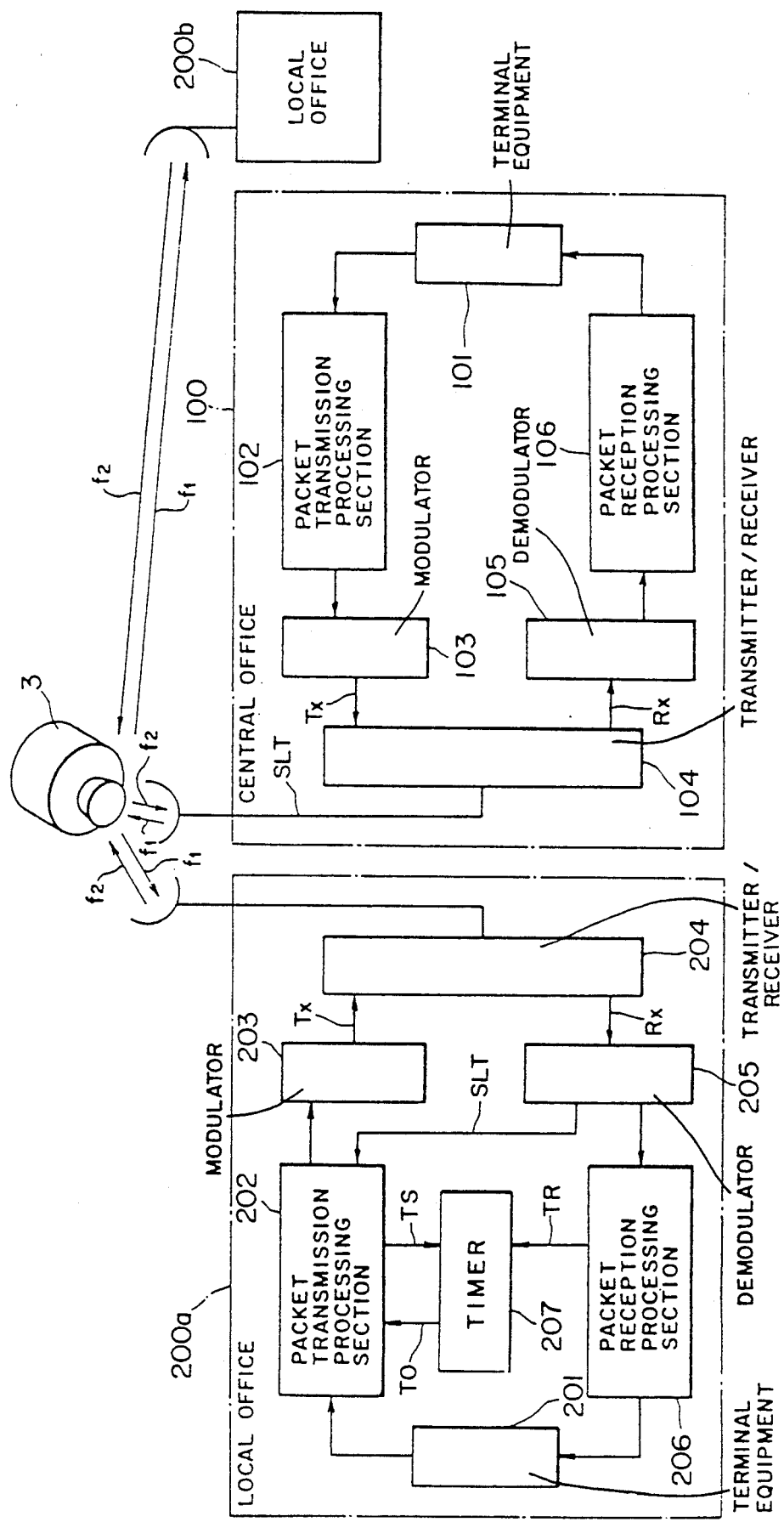
FIG. 1 is a block diagram showing a conventional packet re-transmitting system of the slotted-ALOHA type.

The timer counter 271 produces, when a predetermined interval of time elapses after transmission of a packet, a re-transmitting processing instruction for the transmission packet, and thus corresponds to the timer 207 of the conventional packet re-transmitting system of FIG. 1 described hereinabove.

The counter 272 is provided to manage the transmission slot number TSLN, and the FIFO memory 273 serves as a buffer memory for the transmission slot number TSLN. The comparator 274 compares a reception slot number RSLN in a receiving condition signal RR with a transmission slot number TSLN at a point of time when a packet was transmitted.

The shift register 275 stores therein a reception slot number RSLN and detection information (R/I) of a receiving condition in a receiving condition signal RR detected by the packet reception processing section 26. The decoder 276 decodes code data R or I of a receiving condition, and decoded data of the decoder 276 are sent to the AND gates 277a and 277b, which both receive an output of the comparator 274 as a gate controlling signal. Outputs of the AND gates 277a and 277b are sent to the packet transmission processing section 22 together with an output of the timer counter 271. Accordingly, the AND gates 277a and 277b function as a gate section which produces, when a transmission slot number TSLN corresponds, in accordance with a result of comparison at the comparator 274, to a reception slot number RSLN in a receiving condition signal RR and receiving condition detection information (R/I) indicates irregularity (I), a re-transmitting processing instruction for a transmission packet.

In the packet re-transmitting system of the construction described above, the central office 1 continuously outputs a frame synchronizing signal SYN and a slot signal SLT. At least the frame synchronizing signal SYN is repeated by the communications satellite 3 and is received by the central office 1 by way of an up channel and is extracted as a frame synchronizing signal SYN'. By the way, the delay circuit 171 accepts the frame synchronizing signal SYN and the slot signal SLT and outputs them in a phase delayed by a time equal to a period of time required for the frame synchronizing signal SYN to reciprocate twice between the central office 1 and the communications satellite 3. The counter 172 is reset by the frame synchronizing signal SYN from the delay circuit 171 and is counted up by succeeding slot signals SLT. An output of the counter 172 makes a reception slot number RSLN.

Meanwhile, the packet reception processing section 16 always detects a condition of a reception signal of a packet received from any local offices, for example, whether the reception signal is normal or has a frame check error or whether a reception power higher than a predetermined level has been detected but does not have a form as a packet or the like. Then, if some error is detected, then the packet reception processing section 16 outputs an error signal ER. The memory 174 receives, in response to presence or absence of an error signal ER, a corresponding code from the switch circuit 173. For example, when an error signal ER is not present, the memory 174 receives a code R, but it receives another code I when an error signal ER is present. A reception slot number RSLN then is inputted to the memory 174 from the counter 172. Consequently, the memory 174 stores a reception slot number RSLN and code data R/I of a receiving condition in pair therein. The packet reception processing section 12 forms a receiving condition signal RR in accordance with information of the memory 174 and transmits it to all of the local offices at a time by way of down channels. Taking the fact into consideration that read-out of the memory 174 is executed in response to a carry-out signal from the counter 172, the timing of the transmission is set to such a timing at which receiving condition signals corresponding to a certain transmission frame of local offices are sent back at a time in a reception frame subsequent to a corresponding reception frame of the central office 1.

On the other hand, in the local offices 2a and 2b, the counter 272 of the re-transmission processing section 27 is reset by a frame synchronizing signal SYN from the central office 1 and then is counted up by succeeding slot signals SLT. The counter 272 thus outputs a transmission slot number TSLN. The FIFO memory 273 stores therein, each time the packet transmission processing section 22 transmits a packet, a transmission slot number TSLN then. Consequently, when the FIFO memory 273 has transmission slot number data therein, an output signal DRDY of the FIFO memory 273 is outputted, and as a result, the timer counter 271 is enabled.

Meanwhile, the packet reception processing section 26 inputs, when it receives a receiving condition signal RR from the central office 1, a reception slot number RSLN and a signal R/I of a receiving condition in the receiving condition signal RR to the shift register 275. The comparator 274 compares a transmission slot number TSLN of the FIFO memory 273 with a reception slot number RSLN of the shift register 275 and outputs, when they are equal to each other, a signal A=B. The decoder 276 decodes code data R or I of a receiving condition, and when the code data of a receiving condition are R (regular) at the point of time at which a signal A=B is produced, a signal OMIT is formed by the AND gate 277b. In response to the signal OMIT, a transmission packet which has been transmitted previously and is at the top of the packet transmission processing section 22 is deleted. On the contrary when the code data of a receiving condition are I (irregular) at the point of time at which a signal A=B is produced, another signal RTRY is formed by the AND gate 277a, and in response to the signal RTRY, a transmission packet which has been transmitted previously and is at the top of the packet transmission processing section 22 is re-transmitted. Then, in either case, one data of the FIFO memory 273 is read out (erased), and consequently, the timer counter 271 is reset. Further, in case the FIFO memory 273 still has next transmission slot number data, the operation described above will be repeated.

By the way, it possibly occurs that, even if the central office 1 transmits a receiving condition signal RR, some trouble occurs in a down channel of the communications satellite 3 and consequently a local office cannot receive the receiving condition signal RR regularly. In this instance, the timer counter 271 will time out, and consequently, one of transmission slot number data of the FIFO memory 273 waiting for comparison is read out and a signal RTRY is formed so that a transmission packet which has been transmitted previously and is at the top of the packet transmission processing section 22 is re-transmitted. In this instance, it is not clear whether the transmission packet should have been re-transmitted or the same data have been received doubly by the central office 1, but anyway, the data will be processed in usual packet communications protocol processing by the terminal equipment 11 of the central office 1.

Figure 7:
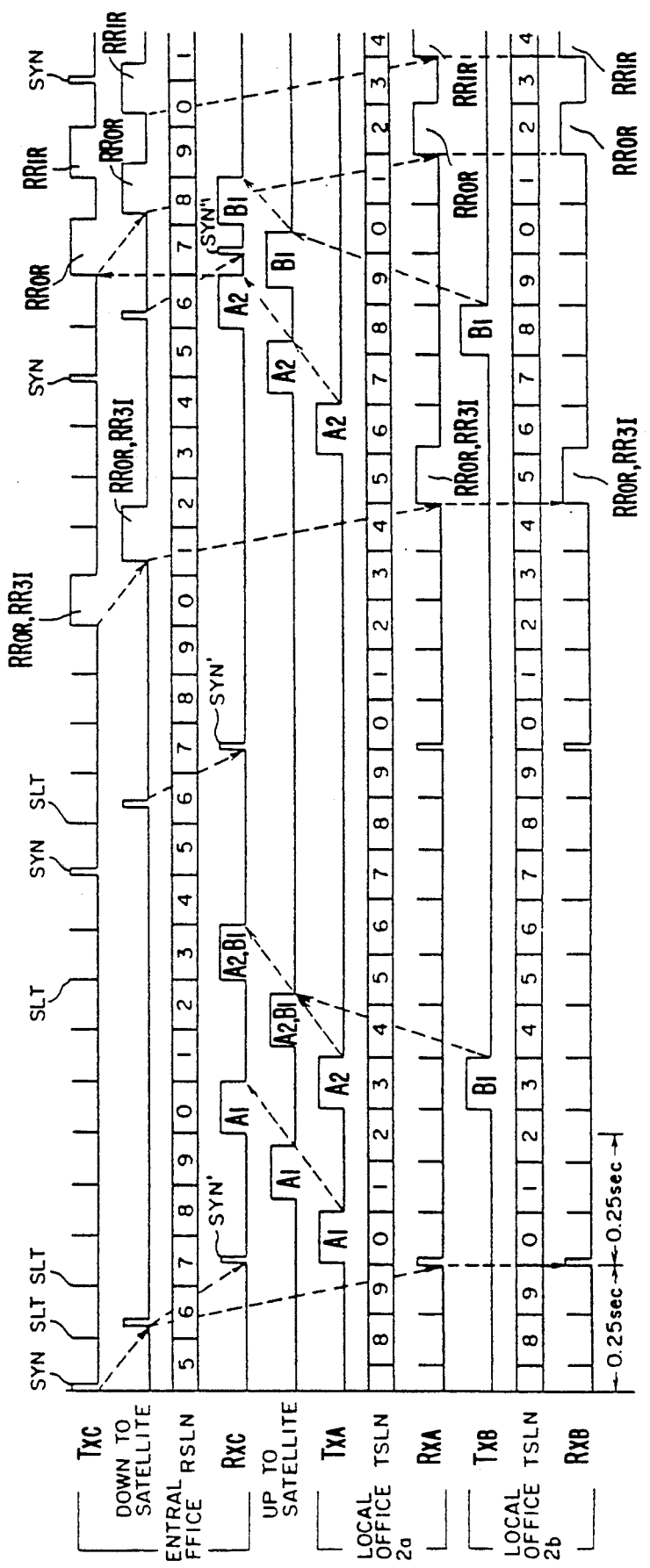
FIG. 7 is a time chart illustrating operation of the packet re-transmitting system of FIG. 2.

FIG. 7 shows a time chart of operation of the packet re-transmitting system of the embodiment described above. When the central office 1 sends out a frame synchronizing signal SYN, the frame synchronizing signal SYN is repeated by the communications satellite 3 and come to all of the local offices after almost 0.25 seconds. All of the local offices manage transmission slot numbers TSLN synchronized with each other with reference to the received frame synchronizing signal SYN like 0, 1, 2, ..., and if, for example, the local office 2a transmits a packet A1 at the timing of the transmission slot number TSLN=0, the packet A1 will reach the central office 1 after about 0.25 seconds. In the central office 1, the packet A1 will be received at the point of time of a reception slot number RSLN=0, and a receiving condition signal $RR_{0R}$ (reception slot number=0, receiving condition=regular) to the packet A1 is stored into the memory 174.

Then at the timing of the transmission slot number TSLN=3, packets A2 and B1 are transmitted simultaneously from the local offices 2a and 2b, respectively. Consequently, the packets A2 and B1 collide with each other at the satellite 3 and come to the central office 1. At the central office 1, the collision packets A2 and B1 are received at the point of the reception slot number RSLN=3, and a receiving condition signal $RR_{3I}$ (reception slot number=3, receiving condition=irregular) to the packets A2 and B1 is stored into the memory 174.

Then, at the top of a next frame, the receiving condition signals $RR_{0R}$ and $RR_{3I}$ are sent back at a time. Consequently, all of the local offices will receive the receiving condition signals $RR_{0R}$ and $RR_{3I}$ at a time. However, since only the local office 2a transmitted a packet at the timing of the transmission slot number TSLN=0, only the local office 2a deletes the packet A1 in response to the receiving condition signal $RR_{0R}$. On the other hand, since only the local offices 2a and 2b transmitted packets at the timing of the transmission slot number TSLN=3, only the local offices 2a and 2b will re-transmit the packets A2 and B1, respectively. Thus, for example, the local office 2a re-transmits the packet A2 at the timing of the transmission slot number TSLN=6 after then, and the other local office 2b re-transmits the packet B1 at the timing of the transmission slot number TSLN=8 two slot distances after then. Accordingly, no collision of the packets occurs now, and consequently, the packets will both be received regularly.

In this manner, with the present packet re-transmitting system, the central office 1 transmits a frame synchronizing signal SYN, and the receiving condition responding section 17 manages a reception slot number RSLN in a predetermined phase relationship with the frame synchronizing signal SYN (for example, in a phase delayed by a period of time required for the frame synchronizing signal SYN to reciprocate twice between the central office 1 and the satellite 3) like 0, 1, 2, 3, .. . Further, the receiving condition responding section 17 forms a receiving condition signal RR including a condition of a reception signal from any of the local offices 2a and 2b detected by the packet reception processing section 16 (a condition whether the reception signal is regular or has a frame check error or that a reception power higher than a predetermined level has been detected but does not present a form as a packet or the like) and a reception slot number RSLN at the point of time, and sends the thus formed receiving condition signal RR at a time to all of the local offices. In the meantime, for example, at the local office 2a, since the re-transmission processing section 27 thereof manages a transmission slot number TSLN in a predetermined phase relationship (for example, in the same phase) with a frame synchronizing signal SYN received from the central office 1 like 0, 1, 2, 3, ..., the phase of the transmission slot number TSLN will lead the phase of the reception slot number RSLN by a period of time required for the frame synchronizing signal SYN to reciprocate once between the local office 2a and the satellite 3. Accordingly, a packet transmitted from the local office 2a at the transmission slot number 0 will be received at the reception slot number 0 of the central office 1, and consequently, synchronization is established between the local office 2a and the central office 1. Thus, the re-transmission processing section 27 compares a reception slot number RSLN in a receiving condition signal RR with a transmission slot number TSLN at a point of time when the packet was transmitted, and when the transmission slot number TSLN corresponds to (coincides with) the reception slot number RSLN in the receiving condition signal RR and receiving condition detection information R/I in the receiving condition signal RR indicates irregularity I, the re-transmission processing section 27 re-transmits the packet. Consequently, the packet re-transmitting time of the present packet re-transmitting system is equal to, at the longest, a period of time required for a signal to go to and return from the satellite, that is, 0.5 seconds+α (α: processing times at the central office and the local office). Therefore, the packet re-transmitting time is reduced significantly comparing with those of conventional packet re-transmitting systems. Consequently, improvement in transmission efficiency can be achieved and the necessity of keeping re-transmission data for a long period of time is eliminated. The advantages are particularly remarkable when data are transmitted in a plurality of packets.

It is to be noted that, while, in the embodiment described above, receiving condition signals RR corresponding to the last transmission frame are sent back collectively (in a compressed condition) for a short period of time in the current reception frame (reception slot number 0 to 9) at the central office 1, alternatively a receiving condition signal RR to a certain transmission frame (transmission slot number 0 to 9) of a local office may be sent back immediately in a current reception frame (reception slot number 0 to 9) of the central office 1.

Figure 8:
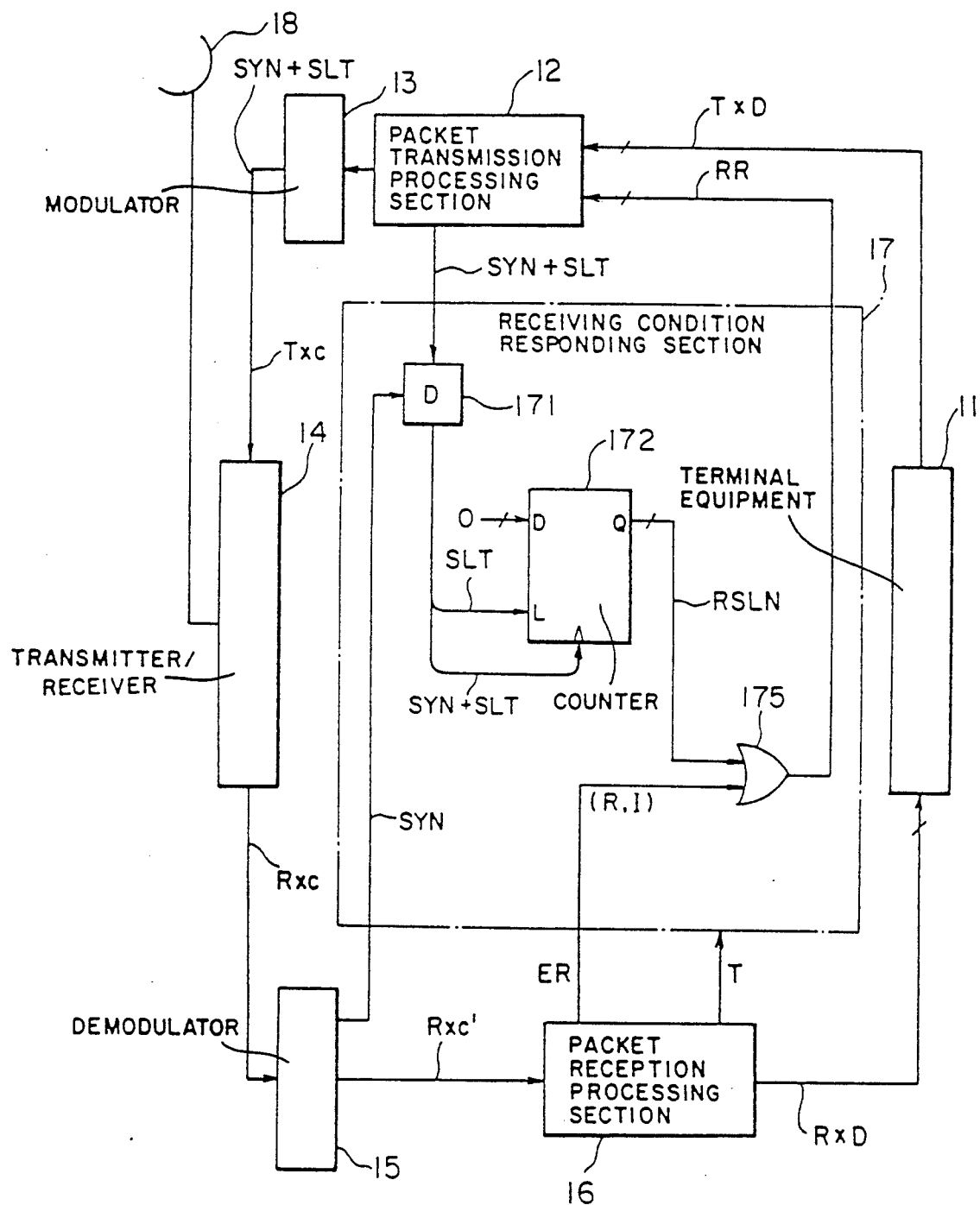
FIG. 8 is a block diagram showing a modified central office of a packet re-transmitting system of FIG. 2.

In this instance, the central office 1 can omit its memory as shown in FIG. 8, in which a modified central office is shown. The modified central office 1 shown in FIG. 8 is different from the central office 1 shown in FIG. 2 in that an OR gate 175 is provided in place of the memory 174 and the switch circuit 173 is omitted while detection information from the packet reception processing section 16 is used directly as it is.

Figure 9:
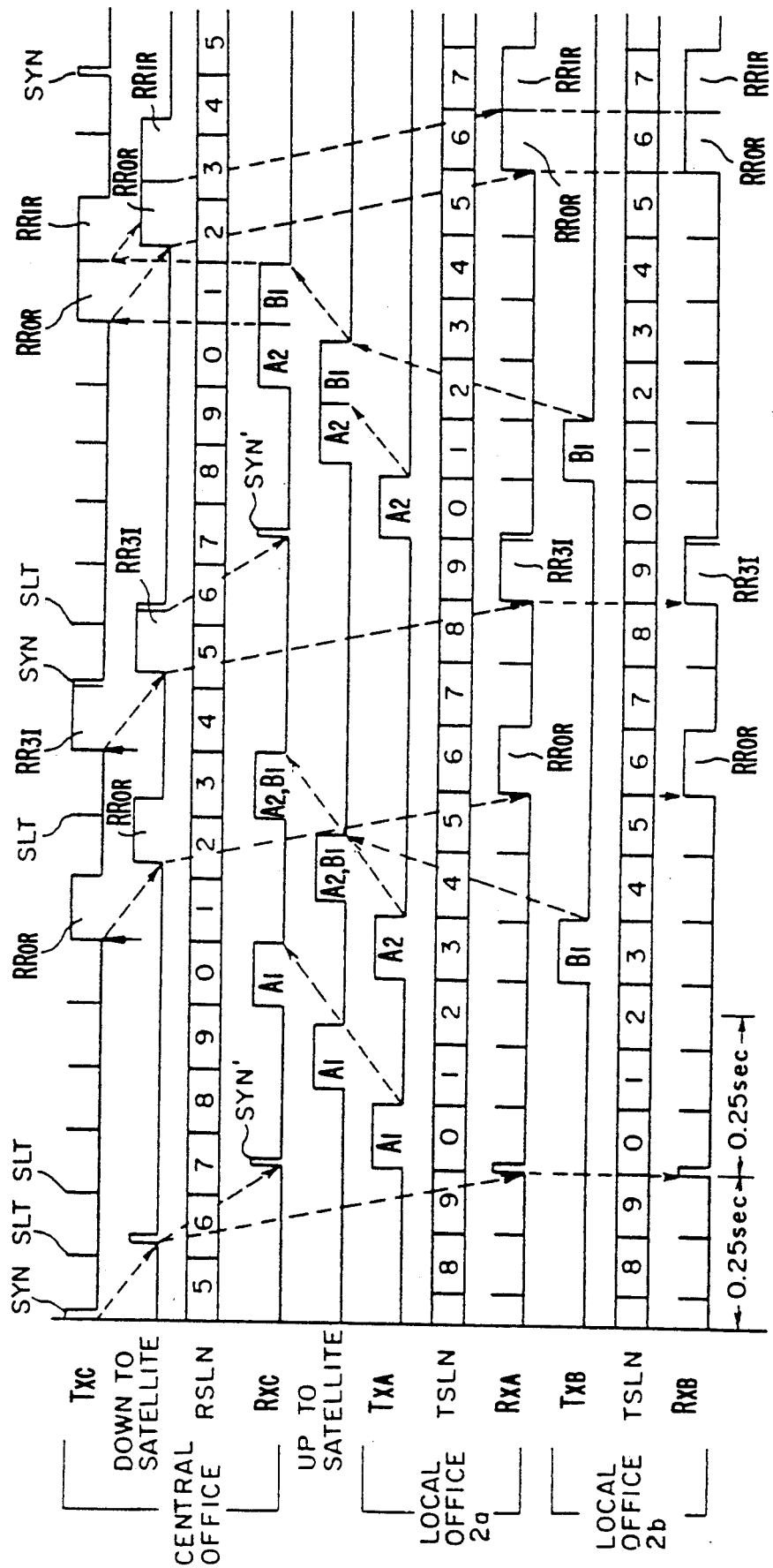
FIG. 9 is a time chart illustrating operation of the packet re-transmitting system of FIG. 2 in which the central office shown in FIG. 8 is employed.

FIG. 9 shows a time chart of operation of the modified packet re-transmitting system in which the central office shown in FIG. 8 is incorporated. Referring to FIG. 9, when the central office 1 sends a frame synchronizing signal SYN, the frame synchronizing signal SYN is repeated by the satellite and reaches all of the local offices after about 0.25 seconds. All of the local offices manage transmission slot numbers TSLN synchronized with each other in accordance with the received frame synchronizing signal SYN like 0, 1, 2, 3, ..., and if it is assumed that, for example, the local office 2a transmits a packet A1 at the timing of the transmission slot number TSLN=0, then the packet A1 will reach the central office 1 after about 0.25 seconds. Then, at the central office 1, the packet A1 is received at the point of time of the reception slot number RSLN=0, and a receiving condition signal $RR_{0R}$ (reception slot number=0, receiving condition=regular) to the packet A1 is sent back immediately. All of the local offices will thus receive the receiving condition signal $RR_{0R}$ at a time. However, since only the local office 2a transmitted a packet at the timing of the transmission slot number TSLN=0, only the local office 2a deletes the packet A1 in response to the receiving condition signal $RR_{0R}$.

Subsequently, at the timing of the transmission slot number TSLN=3, the local offices 2a and 2b transmit packets A2 and B1 simultaneously. Consequently, the packets A2 and B1 collide with each other at the satellite 3 and then reach the central office 1. In the central office 1, the collision packets A2 and B1 are received at the point of time of the reception slot number RSLN=3, and a receiving condition signal $RR_{3I}$ (reception slot number=3, receiving condition=irregular) to the packets A2 and B1 is sent back immediately. All of the local offices will thus receive the receiving condition signal $RR_{3I}$ at a time. However, since only the local offices 2a and 2b transmitted packets at the timing of the transmission slot number TSLN=3, only the local offices 2a and 2b will re-transmit the packets A2 and B1, respectively, in response to the receiving condition signal $RR_{3I}$. Thus, for example, the local office 2a re-transmits the packet A2 at the timing of the transmission slot number TSLN=0 of the next frame, and the other local office 2b re-transmits the packet B1 at the timing of the transmission slot number TSLN=1 of the next frame. Accordingly, the packets will both be received regularly because no collision of them occurs now.

Also with the modified packet re-transmitting system, similarly to the packet re-transmitting system of the embodiment described hereinabove, the packet re-transmitting time is reduced remarkably comparing with those of conventional packet re-transmitting systems.

Further, with the packet re-transmitting system of the embodiment, since the time required for a signal to go to and return from the satellite is known, the delay circuit 171 is constructed so as to delay a signal in accordance with the known time. However, alternatively a returning frame synchronizing signal SYN' at the central office 1 may be extracted and fed back to the delay circuit 171. In this instance, a delay circuit which includes a reversible counter therein is employed as the delay circuit 171. In particular, the reversible counter starts its counting up operation in response to a frame synchronizing signal SYN and continues the counting up operation until a frame synchronizing signal SYN' is received. Thus, at the time when a frame synchronizing signal SYN' is received, the reversible counter completes its measurement of a period of time which has been taken for the frame synchronizing signal SYN to go to and return from the satellite. Then, the reversible counter starts now its counting down operation in response to the frame synchronizing signal SYN' and continues the counting down operation until the count value reaches 0. Thus, at the time when the reversible counter counts to 0, it completes its measurement of a period of time which has been taken for the frame synchronizing signal SYN to go to and return from the satellite twice. Thus, the delay circuit 171 accepts a frame synchronizing signal SYN and a slot signal SLT as inputs thereto and outputs them in a phase delayed, due to processing by the reversible counter, by a period of time which has been taken for the frame synchronizing signal SYN to go to and return from the satellite twice. Then, the counter 172 is reset by a frame synchronizing signal SYN from the delay circuit 171 and is counted up by following slot signals SLT. An output of the counter 172 makes a reception slot number RSLN.

Further, while slot numbers are held coincident between the local offices and the central office in the packet re-transmitting system of the embodiment described above, they need not coincide with each other but must only be kept in a fixed known phase relationship.

The present invention is not limited to the specifically described embodiment, and variations and modifications may be made without departing from the scope of the present invention.

What is claimed is:

1. A packet re-transmitting system for a slotted-ALOHA type satellite communication system, comprising:
    a central office including:
        transmission means for transmitting a frame synchronizing signal;
        managing means, operatively connected to said transmission means, for managing a reception slot number in a relative phase relationship with the frame synchronizing signal received from said transmission means; and
        receiving condition signal outputting means, operatively connected to said managing means, for detecting a condition of each reception signal from any of the local offices, on the basis of error detection in a reception packet and power level detection of a reception signal, and for outputting a receiving condition signal including a reception slot number from said managing means and detection information of a receiving condition at a point in time; and a plurality of local offices each including:

receiving means for receiving the frame synchronizing signal and receiving condition signal from said central office;

slot number managing means, operatively connected to said receiving means, for managing a transmission slot number in a relative phase relationship with the received frame synchronizing signal;

comparison means, operatively connected to said slot number managing means and said receiving means, for comparing a transmission slot number from said slot number managing means at a point of time when a packet was transmitted from the local office with a reception slot number in the receiving condition signal from said receiving means; and re-transmission processing means, operatively connected to said comparison means and said receiving means, for re-transmitting the packet when said comparing means determines that the transmission slot number corresponds to the reception slot number in the receiving condition signal and the receiving condition detection information in the receiving condition signal indicates irregularity.

2. A packet re-transmitting system for a slotted-ALOHA type satellite communication system as claimed in claim 1, wherein said central office transmits a slot signal and a frame synchronizing signal synchronized with the slot signal.

3. A packet re-transmitting system for a slotted-ALOHA type satellite communication system as claimed in claim 1, wherein a receiving condition signal or signals to any of said local offices corresponding to a transmission frame of said local offices are sent back collectively immediately after the reception frame of said central office corresponding to the transmission frame of said local offices.

4. A packet re-transmitting system for a slotted-ALOHA type satellite communication system as claimed in claim 1, wherein a receiving condition signal or signals to any of said local offices corresponding to a transmission slot of said local offices are sent back collectively immediately after a corresponding reception slot of said central office.

5. A packet re-transmitting system for a slotted-ALOHA type satellite communication system as claimed in claim 1, wherein the reception slot number managed by said central office and the transmission slot numbers managed by said local offices coincide with each other.

6. A packet re-transmitting system for a slotted-ALOHA type satellite communication system as claimed in claim 1, wherein said reception slot number managed by said central office is displaced in phase from the frame synchronizing signal by a time required for a signal to go to and return from said communications satellite.

7. A packet re-transmitting system for a slotted-ALOHA type satellite communication system as claimed in claim 1, wherein said managing means includes:

a delay circuit for delaying the frame synchronizing signal and the slot signal by a predetermined phase amount; and a reception slot number managing counter, operatively connected to said delay circuit, operating in response to the frame synchronizing signal and the slot signal delayed by said delay circuit.

8. A packet re-transmitting system for a slotted-ALOHA type satellite communication system as claimed in claim 1, wherein said receiving condition signal outputting means includes a memory for storing therein the reception slot number and the receiving condition detection information.

9. A packet re-transmitting system for a slotted-ALOHA type satellite communication system as claimed in claim 1, wherein said re-transmission processing means includes:

gate means for producing, when the transmission slot number corresponds, in accordance with a result of comparison by said comparison means, to the reception slot number in the receiving condition signal and the receiving condition detection information indicates irregularity, a re-transmitting processing instruction for the packet transmitted during the slot having the transmission slot number.

10. A packet re-transmitting system for a slotted-ALOHA type satellite communication system as claimed in claim 1, wherein said slot number managing means includes:

a counter for managing the transmission slot number.

11. A packet re-transmitting system for a slotted-ALOHA type satellite communication system as claimed 1 in claim, wherein said local office includes:

a timer which produces, when a predetermined period of time elapses after transmission of the packet, a re-transmission processing instruction for the packet transmitted during the slot having the above transmission slot number.

* * * * *